No. 644,262. Patented Feb. 27, 1900.
B. A. STAIR.
STRAINER FOR DOWN SPOUTS.
(Application filed Dec. 22, 1899.)
(No Model.)
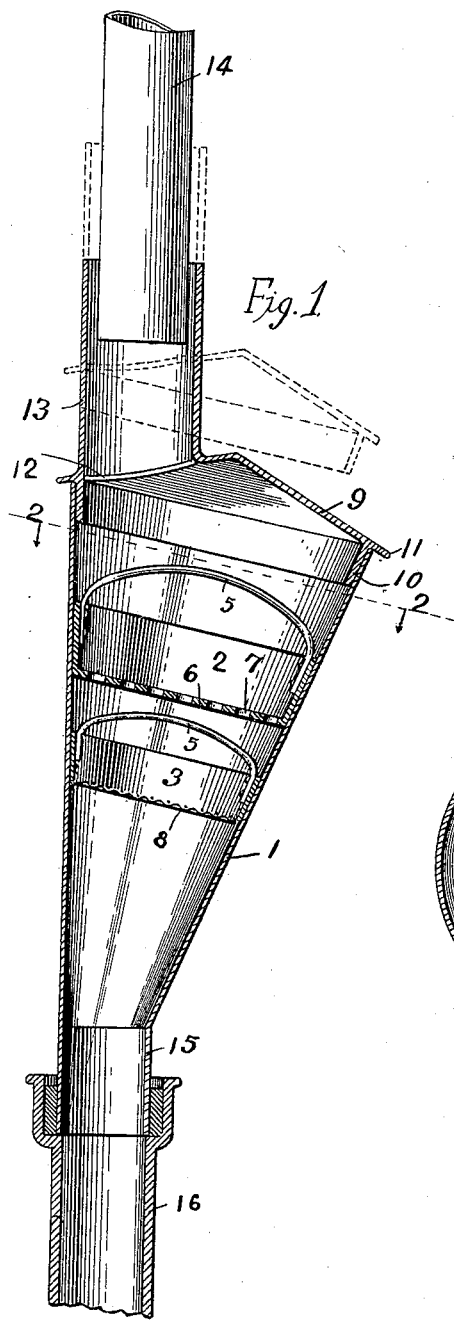
Fig. 1.
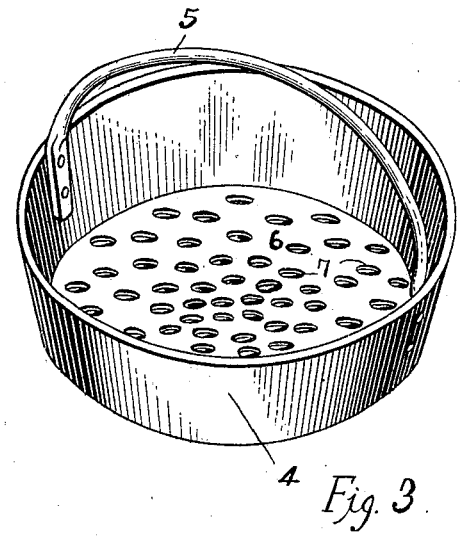
Fig. 3.
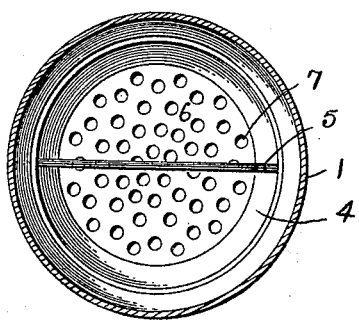
Fig. 2.
Witnesses
Burton A. Stair, Inventor
By his Attorneys,
THE NORRIS PETERS CO., PHOTO-LITHO., WASHINGTON, D. C.

UNITED STATES PATENT OFFICE.

BURTON A. STAIR, OF HARRISONVILLE, MISSOURI.

STRAINER FOR DOWN-SPOUTS.

SPECIFICATION forming part of Letters Patent No. 644,262, dated February 27, 1900.

Application filed December 22, 1899. Serial No. 741,294. (No model.)

*To all whom it may concern:*

Be it known that I, BURTON A. STAIR, a citizen of the United States, residing at Harrisonville, in the county of Cass and State of Missouri, have invented a new and useful Strainer for Down-Spouts, of which the following is a specification.

This invention relates to strainers, and has for one object to provide an improved device of this class especially designed for use in conjunction with a down-spout or the like to separate leaves and other foreign matter from the water which is to be conveyed to a cistern. It is furthermore designed to provide a device which is complete in itself and arranged for convenient application to any down-spout or other pipe-line without altering or changing the latter, and finally to provide for the convenient removal of the individual sieves or strainers without removing the casing or shell of the device from the pipe-line, and thereby facilitating the cleansing of the strainer.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a longitudinal central sectional view of a strainer constructed in accordance with the present invention and applied to the lower end of a down-spout. Fig. 2 is a transverse sectional view taken on the line 2 2 of Fig. 1. Fig. 3 is an enlarged detail perspective view of one of the removable straining devices.

Corresponding parts in the several figures of the drawings are designated by like characters of reference.

Referring to the accompanying drawings, 1 designates the shell or casing of the device, having upwardly-divergent walls and preferably in the form of an inverted cone, the upper and lower ends of which are open.

Located within the shell or casing are two or more superposed straining devices 2 and 3, respectively, one of which has been shown in detail in Fig. 3 of the drawings. Each strainer is in the form of a pan having an upwardly and outwardly divergent marginal rim 4 and a bowed handle 5, having its opposite end secured at diametrically-opposite points to the rim 4 and designed for conveniently applying and removing the strainer. The upper and larger strainer 2 is provided with a blank metallic bottom 6, which has a plurality of comparatively-large perforations 7, while the lower strainer 3 is provided with a bottom of wire-gauze or other foraminous material 8. As indicated in Fig. 1, the divergent rim of each strainer frictionally engages the similarly-inclined walls of the shell or casing 1, so as to conveniently support the strainer within the casing and also to provide for the ready removal of the individual strainers.

The upper open end of the shell or casing is normally closed by means of a removable top or cover 9, having a pendent marginal flange 10, located inwardly from the peripheral edge of the cover and fitting snugly within the upper end of the shell or casing, while the outwardly-directed rim 11 rests upon the upper edge of the casing, so as to support the cover in place. An opening 12 is provided through the top or cover and located adjacent to one side thereof, and rising from the walls of this opening is a pipe-section 13, which is open at its opposite ends, so as to communicate with the interior of the shell or casing and also to telescopically receive the lower end of a down-spout or other pipe-line 14. By this construction and arrangement it will be seen that the cover 9 may be elevated, as illustrated by dotted lines in Fig. 1 of the drawings, so as to permit of the convenient removal of the individual strainers 2 and 3 and for the convenient cleansing of the interior of the shell or casing.

It will be noted by reference to Fig. 1 of the drawings that the shell or casing 1 inclines upwardly and outwardly from the down-spout or pipe-line 14, so that access may be conveniently had to the interior of the shell and to the upper open end thereof. Also the lower end of the shell is provided with a vertically-disposed neck or pipe-section 15 for connection with a suitable discharge-pipe 16, which is designed to convey the clean water to a cistern, as will be understood.

In applying the device to a down-spout or other pipe-line the lower end of the latter should normally extend within the pipe-section 13 at a predetermined distance, so that the lower end of the down-spout may not interfere with the removal of the individual strainers after the cover 9 has been elevated upon the down-spout; but the latter should always be contained within the pipe-section 13, so that there may be no escape of the water. Moreover, the down-spout forms a guide for the cover in the vertical movement thereof.

Although but two individual strainers have been shown in the drawings, it will be understood that any preferred number of strainers may be employed; but in any event the uppermost strainer should be provided with comparatively-large perforations and is designed to collect leaves and other comparatively-large articles, while the lower strainers should have smaller perforations and are designed to separate the smaller particles of foreign matter.

What is claimed is—

1. In a strainer of the class described, the combination with a down-spout or like pipe-line, of a strainer, comprising a shell or casing, a removable top or cover therefor, a pipe-section carried by the cover, communicating with the interior of the strainer, and also telescopically receiving the adjacent end of the down-spout, and a strainer proper removably housed within the shell or casing.

2. In a strainer of the class described, the combination with a down-spout or like pipe-line, of a strainer, comprising a shell or casing, having upwardly-divergent walls, a removable top or cover for the shell or casing, a pipe-section carried by the cover, communicating with the interior of the shell or casing, and telescopically receiving the adjacent end of the down-spout, and a removable strainer proper supported upon the interior walls of the shell or casing, and removable through the upper end of the latter.

3. In a strainer of the class described, the combination with a down-spout or like pipe-line, of a strainer, comprising a shell or casing open at opposite ends and provided with upwardly-divergent walls, one or more strainers proper removably housed within the shell or casing, and comprising a perforate bottom, an outwardly-inclined marginal rim frictionally engaging the similarly-inclined walls of the shell or casing and a handle for removing the strainer, and a removable cover or top for the upper end of the shell or casing, and provided with an opening telescopically receiving the adjacent end of the down-spout.

4. In a strainer of the class described, the combination with a down-spout or like pipe-line, of a strainer, comprising a shell or casing open at its upper and lower ends, and inclined upwardly and outwardly from the down-spout, one or more strainers proper removably housed within the shell or casing, and a removable top or cover for the latter, and provided with an opening telescopically receiving the adjacent ends of the down-spout.

5. In a strainer of the class described, the combination with a down-spout or like pipe-line, of a strainer, comprising a shell or casing open at its upper and lower ends, inclined upwardly and outwardly from the down-spout, and provided with upwardly-divergent walls, one or more strainers proper removably housed within the shell or casing and supported upon the inclined walls thereof, and a top or cover removably fitted to the open upper end of the shell or casing, and provided with an opening, and a pipe-section rising from the wall of the said opening and telescopically receiving the adjacent end of the down-spout.

6. A strainer of the class described, comprising an inverted substantially cone-shaped shell or casing open at its lower and upper ends, and normally inclined to one side of the perpendicular, one or more strainers, located within the interior of the shell or casing, each strainer being substantially circular in form and provided with an outwardly-inclined rim frictionally engaging the inclined walls of the shell or casing, and a removable cover fitted to the upper open end of the shell or casing, and provided with an opening located at one side thereof, and a pipe-section rising from the walls of said opening.

In testimony that I claim the foregoing as my own I have hereto affixed my signature in the presence of two witnesses.

BURTON A. STAIR.

Witnesses:
W. A. HORN,
WM. H. CLEMMENTS.